Patented May 3, 1932

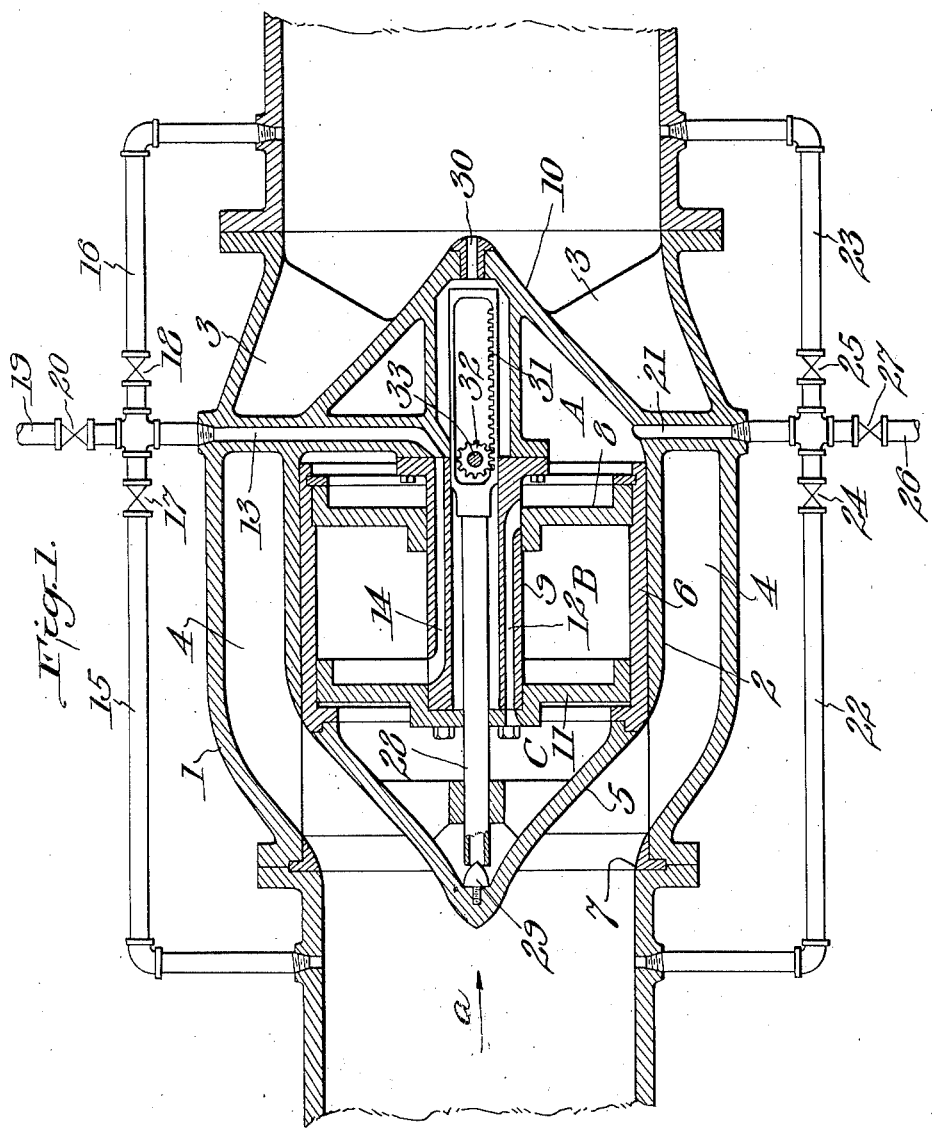

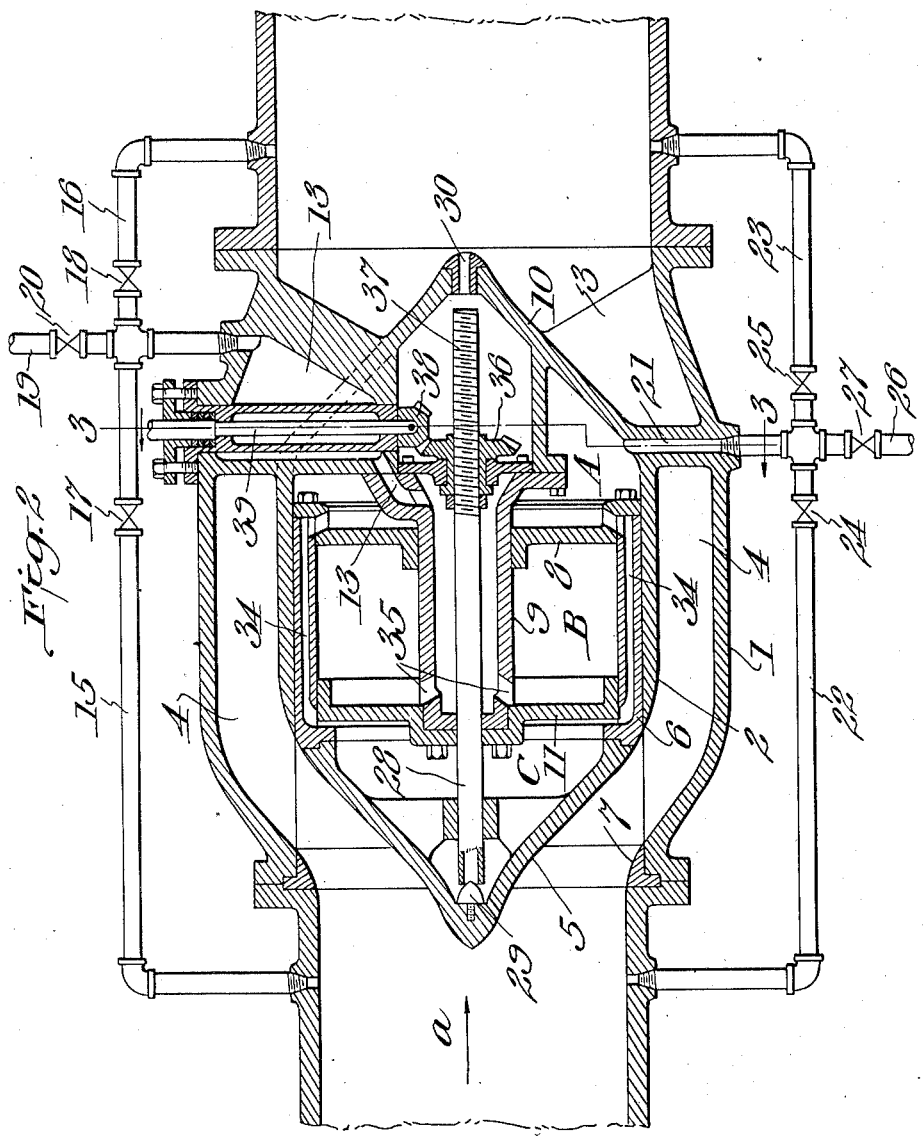

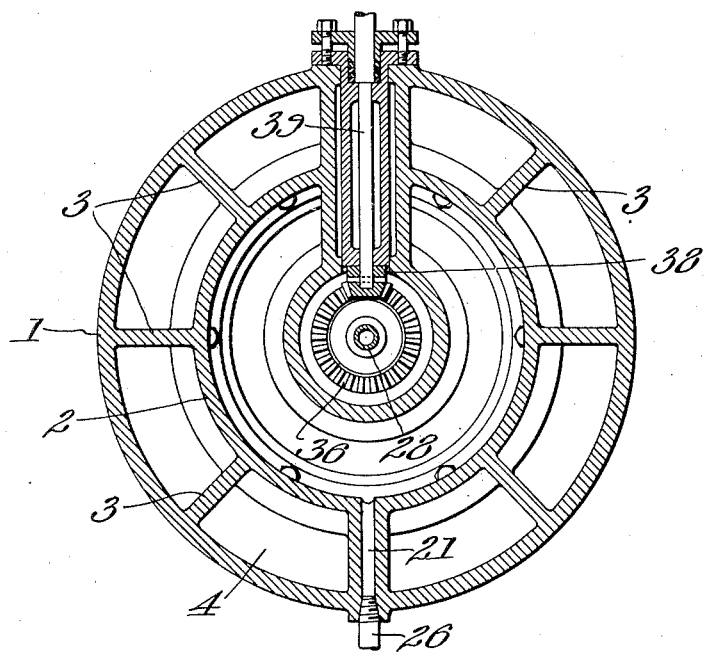

1,856,222

UNITED STATES PATENT OFFICE

LESLIE N. McCLELLAN, PHILLIP A. KINZIE, JOHN L. SAVAGE, AND CHARLES M. DAY, OF DENVER, COLORADO, ASSIGNORS TO UNIVERSAL HYDRAULIC CORPORATION, OF DENVER, COLORADO, A CORPORATION OF COLORADO.

COMBINED FLOW CONTROL AND CHECK VALVE    REISSUED

Application filed January 18, 1929. Serial No. 333,459.

This invention relates to a valve for installation in a pipe line or conduit, such as a city water main, or a discharge pipe from a pump, whereby the flow through such pipe line or conduit may be effectively and automatically controlled, and embodies features of the valve forming the subject-matter of our copending application Serial No. 250,778, filed January 31, 1928.

One object of the invention is to provide a valve which will throttle the passage of water or other fluid through a pipe in the normal direction of flow.

Another object is to provide a valve which, in case of stoppage of flow in such normal direction, will operate as a check valve to prevent reverse flow.

Such a valve is suitable for installation at the discharge end of a centrifugal pump, for example, so that, in case the pump operating power fails, reverse flow of the fluid through the pump may be automatically prevented. Thus, where the power for operating such a pump is an electric motor, and the motor operating current fails, the valve will automatically prevent reverse flow through the pump and reverse rotation of the pump and motor with the possible damage to the pump and motor incident thereto.

Such a valve is also useful in fluid distributing systems to guard against loss of fluid and consequent property damage in case of a pipe being broken. Installations of valves of this type are particularly necessary in conduits which, if broken, would drain a reservoir and, in so doing, release a large volume of water.

As the description of our invention proceeds, it will be apparent to those skilled in the art that the objects and uses of our valve hereinbefore mentioned are merely illustrative and that it fulfills other objects and is susceptible of equally effective operation in various other installations.

The invention consists, broadly, in a combined flow control and check valve, having a valve body provided with a valve seat, an internal cylinder or bearing member arranged within the body and supporting a flow control member or needle in such cooperative alignment with the valve seat that movement of the needle toward and away from its seat will decrease and increase the flow of fluid through the valve, there being fluid-receiving chambers so associated with the internal cylinder or bearing member and needle and so communicating with the interior of the conduit in which the valve is installed and through which the fluid flows that the movements of the needle may be automatically effected in response to pressures established in the fluid-receiving chambers. And the invention consists, further, in means whereby the operation of the valve may be manually controlled, and in various structural details, as we will proceed now to explain and finally claim.

In the accompanying drawings somewhat diagrammatically illustrating the invention, in the several figures of which like parts are similarly designated, Figure 1 is a vertical axial section of a valve embodying our invention, Figure 2 is a view similar to Figure 1, but illustrating a modified form of the valve, Figure 3 is a transverse section taken substantially on the line 3—3 of Figure 2.

The valve comprises a preferably cylindrical outer casing or body 1 in which is axially arranged an internal cylinder or bearing member 2 suitably connected to the body 1 and held in spaced concentric relation thereto by radial ribs 3 (see particularly Fig. 3) thus forming an annular waterway 4 through the valve between the body 1 and cylinder 2. There is a substantially conical flow control member or needle 5 having a cylindrical extension 6 arranged for axial telescoping movement within the cylinder or bearing member 2 and cooperating with an annular seat ring 7 in the body 1. The inner end of the needle extension 6 is provided with a piston or diaphragm 8 in sliding engagement with the inside of cylinder 2 and the outside of an axial tube 9 supported by a conical head 10 which closes one end of the cylinder 2. Fixed to the end of the tube 9 is a diaphragm 11 the periphery of which is in sliding engagement with the interior of the extension 6.

The enclosure formed by the cylinder 2 and the telescoping needle 5 is divided by the sliding piston or diaphragm 8 and the fixed diaphragm 11 into three, separate, tandem pressure chambers A, B and C. Chamber A is in communication with chamber C through passage 12 cored in the wall of the central tube 9. This passage permits flow of fluid from chamber A to chamber C or vice versa whenever the needle moves toward and away from its seat 7. Thus the unit pressures in chambers A and C are equalized at all times.

Chamber B is supplied with fluid at pipe line pressure through passageway 13 and cored passage 14 in tube 9, connection being made between passageway 13 and the pipe line or conduit on each side of the valve by pipes 15 and 16 provided with valves 17 and 18, respectively. Chamber B may be exhausted to atmosphere through passageway 13 and a pipe 19 which is provided with a valve 20 for this purpose in order that proper relative actuating forces within the chambers may be secured when necessary.

Chambers A and C are supplied with fluid under pipe line pressure by means of a passageway 21 in communication with the pipe line or conduit on each side of the valve by means of pipes 22 and 23 provided with valves 24 and 25, respectively, and means are also provided for exhausting these chambers to atmosphere, if desired, through a pipe 26 provided with a valve 27.

The arrow $a$ indicates the direction of normal flow of fluid through the pipe line or conduit and valve.

With the pressure conditions and control means thus established it will be obvious that the movable needle is subject to the following operative forces tending to close the valve, viz:—pipe line pressure within chamber A acting against the face of annular piston 8, with or without pressure in chamber B equal to or lower than atmospheric pressure, and pipe line pressure within chamber C acting against the conical end of needle 5, with or without pressure in chamber B equal to or lower than atmospheric pressure. It is also subject to the following operative forces tending to open the valve, viz:—Pipe line pressure in chamber B acting against the face of annular piston 8 with or without the pressure in chambers A and C equal to or lower than atmospheric pressure, and pipe line pressure acting against part or all of the outside of the conical end of the needle 5, depending upon whether the needle is closed against seat ring 7, or is partly or wholly open.

With these opposing variable forces available, it is possible to force the needle open or closed or to hold it in any intermediate position by suitably regulating the pressures in chambers A and C and in chamber B. For example, when the pressure is reduced in chamber B, and pressure is permitted to accumulate in chambers A and C, the movable needle will be forced to close against seat 7, whereas, when the pressure is permitted to accumulate in chamber B and is reduced in chambers A and C the movable needle will be forced open. Moreover, when the closing and opening forces are equalized by suitable control of the pressure in chambers A and C and chamber B to hold the needle in any intermediate position, the valve can be maintained partially open to produce a throttling effect on the fluid passing through it.

In normal operation of the valve for throttle or check purposes, passageway 13 is maintained open to pipe line pressure, connection being made to the upstream or inflow side of the valve through pipe 15, whereas passageway 21 is maintained closed, pressure being supplied to chambers A and C by restricted leakage past annular piston 8 and fixed diaphragm 11. With this adjustment, the pressure in chambers A and C is automatically controlled by leakage from these chambers through a hollow control shaft 28 which cooperates with an acorn valve 29, these parts constituting a manually adjustable control member. The shaft 28 discharges through an orifice 30 in the conical head 10 and in such manner the forces tending to move the needle 5 toward its seat ring 7 are equalized by the forces tending to move it away from its seat ring.

For example, if the leakage from chambers A and C past acorn valve 29 through shaft 28 and orifice 30 is not sufficient to equalize the opening and closing forces acting on needle 5, pressure will accumulate in chambers A and C until needle 5 is moved toward its seat. Any such movement of the needle will increase the leakage area around acorn valve 29, thus in turn relieving the pressure in chambers A and C and arresting seating movement of the needle.

The movable needle in this manner automatically seeks the position which permits just sufficient leakage from chambers A and C through shaft 28 and orifice 30 to equalize or balance the opening and closing forces established in chambers A and C and in chamber B acting upon it. We therefore provide means, such as the rack 31 carried by shaft 28 with which meshes a pinion 32 rotatable by means of a shaft 33 extending through the valve body 1, whereby the shaft 28 may be manually adjusted relatively to the acorn valve 29. Obviously, the needle 5 will move toward and away from its seat as the opening at acorn valve 29 is diminished and increased, respectively, and the valve may thus be closed or opened or held in any intermediate throttling position, as desired.

With the valve adjusted at partial or full open position, as is customary when it is used as a check valve, any reversal of flow will tend to force fluid into chambers A and C through orifice 30 and shaft 28 past acorn valve 29, thus increasing the pressure in chambers A and C. At the same time the reversed flow will tend to reduce the flow through passage 13 into chamber B, valve 18 being normally closed, thus reducing the pressure in this chamber. Obviously, these changes in pressure will decrease the opening forces and increase the closing forces acting on needle 5, thus causing the needle to seat on its seat ring 7 and close the valve, and thereby stop reverse flow through the pipe line or conduit.

Having thus closed automatically, due to the reversal of flow in the pipe line, the valve will remain closed until normal pressure is reestablished in the upstream or inflow side of the valve, at which time the valve will again open with the opening of the needle to its original position due to the reestablishment of the pressures obtaining in chambers A and C and in chamber B before the reversal of flow.

If desired, the needle 5 may be locked in seated position to keep the valve closed by forcing the end of shaft 28 into fixed engagement with the acorn valve 29. When locked in this manner the valve will remain closed after normal pressures have been reestablished until opened manually by appropriate operation of the shaft 33 and through it of the pinion 32 and rack 31.

If it is desired to open the valve and release water in the reverse direction of flow before normal pressures at the inflow or upstream side of the valve have been reestablished, this can be done by exhausting pressure from chambers A and C to atmosphere through passageway 21, valve 27 and pipe 26 and supplying pressure to chamber B from the out flow or downstream side of the valve through pipe 16, valve 18 and passageway 13.

It will thus be seen that the valve of our invention has the following operative characteristics, viz: It can be opened or closed manually under normal flow by appropriate movement of the shaft 28 relatively to the acorn valve 29. It can be held in any desired flow throttling position under normal flow. It will close automatically from any position of the needle 5 under reverse flow, and will open automatically upon resumption of normal flow. It can be locked against automatic opening. It can be opened manually with pressure at out-flow or downstream side and no pressure on inflow or upstream side.

In the modification illustrated in Figures 2 and 3 all of the essential elements of the valve are substantially the same, and function in the same manner, as those already described with reference to Figure 1, and are similarly designated. The modifications are made in details of construction, as follows: Chambers A and C instead of being in communication through a passage formed in the wall of the central tube 9, communicate through a plurality of passages 34 formed in the cylindrical extension 6 of the needle 5, and chamber B is in communication with passageway 13 through the interior of the tube 9 and openings 35 in its wall. Also, instead of using the rack and pinion arrangement for adjusting shaft 28 relatively to the acorn valve 29, we employ means including a bevel gear 36 engaging a screwthread 37 on shaft 28 and meshing with a pinion 38 carried by an operating shaft 39 which extends through the valve body 1 to suitable operating gear as in the case of shaft 33. Thus, when shaft 39 is rotated the bevel gear and pinion connection with shaft 28 will move the shaft 28 axially by means of the screwthread 37.

It is to be understood that these modifications are only illustrative of the flexibility of the design of our valve and its adaptability to changes, both as to the formation and assembly of its parts and the arrangement of its operating mechanism.

With reference to the operation of our valve, it will be noted that the differential between the opening and closing forces acting upon the needle 5 is much greater than in other valves with which we are familiar, owing to large actuating area afforded by the annular piston 8. Thus we provide greater forces for overcoming friction in the needle and for operating the valve under low conduit pressures.

Slamming of the needle in wide open position is prevented by gradual restriction of the end opening of passage 12 (Fig. 1) as piston 8 slides over it, thus, in effect, causing chamber A to function as a dash-pot. The same is true of the end openings of passages 34 (Fig. 2) as they slide over the peripheral edge of diaphragm 11. Also the needle is prevented from slamming to its seat by means of the restriction of the end opening of passage 14 as piston 8 slides over it. This is true also in respect to the openings 35 (Fig. 2), the chamber B thereby functioning as a dash-pot. It will be apparent, moreover, that too rapid movement of the needle is prevented inherently by the action of the annular piston 8 between the opposing pressure chambers A and B.

One very salient feature of our invention is the arrangement of the needle so that it closes in a direction against normal flow (see arrow a) but with reverse flow. This is important for the reason that, where a valve of this character is used as a check valve, it is subjected only to moderate fluid velocities, such as twelve or fourteen feet per second, under normal flow conditions, whereas, under reverse flow conditions, it is subjected to very high velocities, in some cases to full spouting velocities. It is thus essential that a valve for check purposes be of a type suitable for operation when subjected to high fluid velocities in the direction of reverse flow. The needle type of valve is well suited to this purpose and we have enhanced its value by arranging the needle to close in the direction of reverse flow, as stated, thereby making it unnecessary to force it to closed position against the flow of higher velocity. In this respect also our valve is superior to those heretofore known to us.

It will be apparent, therefore, that by our invention we have provided a valve well adapted to the purposes for which it is designed, and capable of marked flexibility in operation, whereby its various functions may be effectively automatically and manually controlled.

Various changes are deemed to be within the spirit of the invention and the scope of the following claims.

We claim:—

1. A combined flow control and check valve, having a valve body, a bearing member arranged therein and providing a fluid flow passage therethrough, a flow control member carried by said bearing member and slidable relatively thereto and to said body for controlling the flow of fluid through said passage, a diaphragm carried by said bearing member and a piston carried by said control member and providing a plurality of pressure chambers within said members, means for supplying fluid from the body of fluid controlled to said chambers, and valve-controlled means for equalizing the pressure in the several chambers and operable in response to differences in pressure therein as reflected by movement of said control member.

2. A combined flow control and check valve, having a valve body, a bearing member arranged therein and providing a fluid flow passage therethrough, a valve seat carried by said body, a flow control member carried by said bearing member and movable therein toward and away from said seat to control the flow of fluid through said passage, a fixed diaphragm carried by said bearing member, a piston movable with said control member, said diaphragm and piston dividing the space within said bearing member and control member into three chambers, means affording communication between two of said chambers, and adapted to equalize the pressures therein tending to move said control member toward said seat, means for introducing fluid into the other chamber to establish pressure therein tending to move said control member away from said seat, and valve-controlled means for automatically establishing a balance of pressures between the first-mentioned chambers and the other chamber in response to movement of the control member incident to a difference in pressures therein, to automatically maintain said control member in substantially fixed flow control position during normal fluid flow.

3. A combined flow control and check valve, having a valve body, a bearing member arranged therein and providing a fluid flow passage therethrough, a valve seat carried by said body, a flow control member carried by said bearing member and movable herein toward and away from said seat to control the flow of fluid through said passage, a fixed diaphragm carried by said bearing member, a piston movable with said control member, said diaphragm and piston dividing the space within said bearing member and control member into three chambers, means affording communication between two of said chambers and adapted to equalize the pressures therein tending to move said control member toward said seat, means for introducing fluid into the other chamber to establish pressure therein tending to move said control member away from said seat, valve-controlled means for automatically establishing a balance of pressures between the first-mentioned chambers and the other chamber in response to movement of the control member incident to a difference in pressures therein, to automatically maintain said control member in substantially fixed flow control position during normal fluid flow, and means for adjusting said valve-controlled means to change the position of the flow control member.

4. A combined flow control and check valve, having a valve body, a bearing member arranged therein and providing a fluid flow passage therethrough, a flow control member carried by said bearing member and slidable relatively thereto and to said body for controlling the flow of fluid through said passage, a diaphragm carried by said bearing member and a piston carried by the said control member and providing a plurality of pressure chambers within said members, means for supplying fluid from the body of fluid controlled to said chambers, and manually adjustable valve controlled means for equalizing the pressure in the several chambers and operable in response to differences in pressure therein as reflected by movement of said control member.

5. A combined flow control and check valve, having a valve body, a bearing member arranged therein and providing a fluid flow passage therethrough, a flow control member carried by said bearing member and slidable relatively thereto and to said body for controlling the flow of fluid through said passage, a diaphragm carried by said bearing member and a piston carried by said control member and providing a plurality of pressure chambers within said members, means for supplying fluid from the body of fluid controlled to said chambers, valve-controlled means for equalizing the pressure in the several chambers and operable in response to differences in pressure therein as reflected by movement of said control member, and means for manually controlling the relative pressures in said chambers.

6. A combined flow control and check valve, including a valve body having an in-flow end and an out-flow end, a flow control member mounted therein and capable of movement against the direction of normal flow to arrest or throttle the flow of fluid through the valve, means defining a plurality of pressure chambers associated with said control member, means for introducing fluid from the controlled body of fluid into said chambers from the in-flow end of said valve during normal flow conditions, and means affording communication between certain of said chambers and the out-flow end of said valve, said communication affording means serving to admit fluid to said certain chambers in event of reverse flow to establish pressure therein to move said control member in the direction of reverse flow to flow arresting position.

7. A combined flow control and check valve, including a valve body having an in-flow end and an out-flow end, a flow control member mounted therein and capable of movement against the direction of normal flow to arrest or throttle the flow of fluid through the valve, means defining a plurality of pressure chambers associated with said control member, means for introducing fluid from the controlled body of fluid into said chambers from the in-flow end of said valve during normal flow conditions, and valved means affording communication between certain of said chambers and the out-flow end of said valve, said communication affording means serving to admit fluid to said certain chambers in event of reverse flow to establish pressure therein to move said control member in the direction of reverse flow to flow arresting position.

8. In a valve of the needle type, a valve body having an in-flow and out-flow end, a valve seat at the in-flow end of said body, a flow control member and a bearing member within said body and cooperating therewith to provide an annular fluid passage between the ends of said body, said members telescoping to permit movement of said control member towards and from said valve seat, means cooperating with said members to provide a plurality of chambers for receiving pressure fluid for moving said control member, a chamber wholly in said bearing member and an opening in the wall of said bearing member affording free communication between said chamber and the fluid passage at the out-flow end of said body, and means including valve elements carried by each of said members affording communication between said last chamber and a pressure chamber in which established pressures tend to move said control member into engagement with the valve seat.

In testimony whereof, we affix our signatures.

LESLIE N. McCLELLAN.
PHILLIP A. KINZIE.
JOHN L. SAVAGE.
CHARLES M. DAY.